United States Patent [19]

Neufert et al.

[11] Patent Number: 5,785,937

[45] Date of Patent: Jul. 28, 1998

[54] METHOD FOR THE CATALYTIC CONVERSION OF NITROGEN OXIDES PRESENT IN THE EXHAUST GAS OF AN INTERNAL-COMBUSTION ENGINE

[75] Inventors: Ronald Neufert; Wieland Mathes, both of Michelau, Germany; Dagmar Schobert-Schaefer, München; Lothar Hofmann, Burgkunstadt, all of Germany

[73] Assignee: Siemens Aktiengesellschaft, Munich, Germany

[21] Appl. No.: 798,517

[22] Filed: Feb. 10, 1997

Related U.S. Application Data

[63] Continuation of PCT/DE95/00646, May 16, 1995.

[30] Foreign Application Priority Data

Aug. 10, 1994 [DE] Germany .......................... 44 28 329.6

[51] Int. Cl.[6] .................................................. B01D 53/94
[52] U.S. Cl. .................................... 423/213.2; 423/213.7; 423/239.1
[58] Field of Search .................... 423/239.1, 213.2, 423/213.7

[56] References Cited

FOREIGN PATENT DOCUMENTS

| | | |
|---|---|---|
| 0 362 483 A1 | 4/1990 | European Pat. Off. . |
| 0 515 857 A1 | 12/1992 | European Pat. Off. . |
| 0 554 766 A1 | 8/1993 | European Pat. Off. . |
| 0 555 746 A1 | 8/1993 | European Pat. Off. . |
| 33 37 793 A1 | 5/1985 | Germany . |
| 34 07 289 A1 | 9/1985 | Germany .......................... 423/239.1 |
| 34 07 291 A1 | 9/1985 | Germany .......................... 423/213.2 |
| 36 15 021 A1 | 11/1987 | Germany . |
| 37 21 572 A1 | 2/1988 | Germany . |
| 42 17 552 C1 | 8/1993 | Germany . |
| 42 37 705 A1 | 5/1994 | Germany . |
| 43 15 278 A1 | 11/1994 | Germany . |
| 54-110971 A | 8/1979 | Japan . |
| WO 96/04980 | 2/1996 | WIPO . |

*Primary Examiner*—Gary P. Straub
*Assistant Examiner*—Timothy C. Vanoy
*Attorney, Agent, or Firm*—Herbert L. Lerner; Laurence A. Greenberg

[57] ABSTRACT

A method is provided in which the reducing agent, during the starting phase of the internal-combustion engine and during operation with decreasing and, if appropriate, virtually constant exhaust gas temperature, is fed superstoichiometrically in relation to the nitrogen oxide concentration, while taking into account the temperature-dependent storage capacity of a denitration catalytic converter for the reducing agent. The reducing agent is otherwise fed substoichiometrically. In this manner, the catalytic converter is kept at all times at a preferred charge level, so that on one hand it is possible to provide sufficient stored reducing agent for the catalytic conversion and on the other hand it is possible to still have a reducing agent buffer available which avoids slip of the reducing agent. The invention can be used in all internal-combustion engines operated with air excess, such as diesel engines and lean-burn engines.

13 Claims, 1 Drawing Sheet

METHOD FOR THE CATALYTIC CONVERSION OF NITROGEN OXIDES PRESENT IN THE EXHAUST GAS OF AN INTERNAL-COMBUSTION ENGINE

CROSS-REFERENCE TO RELATED APPLICATION

This application is a Continuation of International Application Ser. No. PCT/DE95/00646, filed May 16, 1995.

BACKGROUND OF THE INVENTION

Field of the Invention

The invention relates to a method for the catalytic conversion of nitrogen oxides present in the exhaust gas of an internal-combustion engine, in which a reducing agent is introduced into the exhaust gas upstream of a denitrification catalytic converter, as seen in the direction of flow of the exhaust gas.

In the selective catalytic reduction (SCR) of nitrogen oxides, a reducing agent, generally ammonia or an ammonia-releasing substance, such as an aqueous urea solution, must be added to the exhaust gas containing the nitrogen oxides. The reducing agent is reacted together with the nitrogen oxides to form environmentally harmless nitrogen, oxygen and water in what is termed an SCR catalyst, which is usually based on titanium dioxide with additions of metal oxides, such as vanadium oxide, molybdenum oxide and/or tungsten oxide.

In the case of a non-steady-state mode of operation of the exhaust gas generator (engine, furnace), as occurs especially in the case of motor vehicle engines, the nitrogen oxide concentration, the exhaust gas mass flow rate and the exhaust gas temperature vary within broad ranges. That fact places considerable demands on the metering strategy and accuracy of metering for the reducing agent introduced into the exhaust gas. In the majority of currently known methods for metering the reducing agent, the reducing agent is introduced into the exhaust gas in proportion to the nitrogen oxide throughput. In those methods, the reducing agent stream fed to the exhaust gas must be selected to be markedly substoichiometric in relation to the nitrogen oxide concentration in order to reliably prevent a breakthrough of the reducing agent, in particular an ammonia breakthrough. However, that does not completely utilize the catalytic activity of the catalyst, so that the higher conversion rates which are achievable in principle with the catalytic converter cannot be achieved based on that metering strategy.

Furthermore, European Patent Application 0 515 857 A1; German Patent DE 42 17 552 C1, corresponding to U.S. Pat. No. 5,369,956; European Patent Application 0 554 766 A1; and European Patent Application 0 362 483 A1, corresponding to U.S. Pat. No. 4,963,332, disclose methods in which the reducing agent is fed-in in superstoichiometric pulses and the catalytic converter is run "empty" in the time intervals between two pulses. Those methods are also burdened with the above-mentioned disadvantage.

German Published, Non-Prosecuted Patent Application DE 42 37 705 A1; German Published, Non-Prosecuted Patent Application DE 36 15 021 A1; European Patent Application 0 555 746 A1; German Published, Non-Prosecuted Patent Application DE 33 37 793 A1, corresponding to U.S. Pat. No. 4,681,746; and German Published, Non-Prosecuted Patent Application DE 37 21 572 A1, also disclose methods for metering the amount of reducing agent to be introduced. In German Published, Non-Prosecuted Patent Application DE 42 37 705 A1; European Patent Application 0 555 746 A1; and German Published, Non-Prosecuted Patent Application DE 33 37 793 A1, corresponding to U.S. Pat. No. 4,681,746, the metering rate of the reducing agent is controlled through the nitrogen oxide concentration and, if appropriate, through the exhaust gas temperature. In German Published, Non-Prosecuted Patent Applications DE 36 15 021 A1 and DE 37 21 572 A1, the metering rate of the reducing agent is controlled indirectly through parameters characterizing the operating state of an internal-combustion engine.

SUMMARY OF THE INVENTION

It is accordingly an object of the invention to provide a method for the catalytic conversion of nitrogen oxides present in the exhaust gas of an internal-combustion engine, which overcomes the hereinafore-mentioned disadvantages of the heretofore-known methods of this general type and with which the catalytic activity of the catalytic converter can be exploited as fully as possible and at the same time an ammonia slip above a tolerance level is avoided.

With the foregoing and other objects in view there is provided, in accordance with the invention, a method for the catalytic conversion of nitrogen oxides present in the exhaust gas of an internal-combustion engine, which comprises introducing a reducing agent into an exhaust gas of an internal-combustion engine upstream of a denitration catalytic converter, as seen in flow direction of the exhaust gas; feeding the reducing agent superstoichiometrically in relation to a nitrogen oxide concentration only during operating periods in which the catalytic converter preferentially stores the reducing agent, in particular during a starting phase of the internal-combustion engine and during operation with decreasing and, if appropriate, virtually constant exhaust gas temperature, while taking a temperature-dependent storage capacity of the catalytic converter for the reducing agent into account; and otherwise feeding the reducing agent substoichiometrically.

In this manner, taking into account the temperature-dependent storage capacity of the denitration catalytic converter for the reducing agent, i.e. also taking into account the maximum amount of reducing agent which can be stored in the catalytic converter, an increased amount of reducing agent is offered for storage in operating intervals in which the catalytic converter preferentially stores reducing agent, due to the superstoichiometric feed. In the other operating phases, a slightly substoichiometric feed of the reducing agent is sufficient in order to ensure that a complete nitrogen oxide decomposition is achieved together with stored and fed-in reducing agent. Since in this manner the catalytic converter is kept at each time point, in the range of a preferred charge level, which generally deviates from the maximum charge level, particularly high nitrogen oxide conversion rates are achieved. However, at the same time, and in particular due to the temperature-dependent storage capacity of the catalytic converter for the reducing agent being taken into account, in the event of a positive jump in load, which leads to an increase in the exhaust gas temperature and thus to desorption of the reducing agent stored in the catalytic converter, the catalytic converter can still absorb this desorbed reducing agent along the flow path and/or consume it in the catalytic conversion. An ammonia slip above a tolerance limit, which for ammonia is about 3 to 5 ppm, is reliably avoided in this manner.

In accordance with another mode of the invention, in order to take the temperature-dependent storage capacity of the catalytic converter for the reducing agent into account and thus to determine the amount of reducing agent which can still be stored by the catalytic converter or the amount of reducing agent desorbing from the catalytic converter, it is advantageous if the catalytic converter temperature is determined on-line. In this case, the catalytic converter temperature can be measured, for example, at the inlet and outlet of the catalytic converter, or else alternatively it can be calculated from a measurement of the exhaust gas temperature.

In accordance with a further mode of the invention, in order to determine the degree of substoichiometric or superstoichiometric feed of the reducing agent, it is expedient if the actual charge level of the catalytic converter is determined on-line. This can be performed, for example, by a continuous summation of the amounts of nitrogen oxide and the amounts of reducing agent starting from a defined initial charge level of the catalytic converter. When the catalytic converter temperature and its temperature-dependent catalytic activity are simultaneously taken into account, a relatively precise indication of the conversion rate of the catalytic converter is obtained and thus also of the consumption and storage of reducing agent in the catalytic converter.

In accordance with an added mode of the invention, the aim of keeping the catalytic converter in the range of a preferred charge level is particularly readily achieved if the amount of nitrogen oxide emitted by the internal-combustion engine is determined on-line. In this case, the nitrogen oxide emission of the engine can be determined at each current operating point through electronically stored performance data, by measuring certain parameters which describe the operating point unambiguously, such as preferably rpm, travel of the injection pump control rod and exhaust gas temperature, in the engine during operation. Due to the toxicity of ammonia and the odor nuisance due to ammonia, the reducing agent is conveyed in the vehicle in the form of an aqueous urea solution from which the amount of ammonia required for catalytic conversion of the nitrogen oxides is released by hydrolysis, after metering into the exhaust gas. For this purpose, the aqueous urea solution is introduced into the exhaust gas stream in a finely atomized state and hydrolyzed to ammonia and steam in a hydrolysis catalytic converter.

In accordance with an additional mode of the invention, the superstoichiometric feed in the engine-starting phase is not performed until a specific minimum temperature of the catalytic converter has been exceeded, since this hydrolysis process as well as the subsequent catalytic reaction of the nitrogen oxides with ammonia have a minimum temperature which is dependent on the particular catalytic converter and the physical conditions.

In accordance with yet another mode of the invention, measures can be taken so that the SCR catalytic converter is free of reducing agent in the engine-starting phase when the specific minimum temperature of the catalytic converter is reached, in order to provide particularly precise determination of the charge level of the catalytic converter with the reducing agent. For example, a suitable measure can be heating the catalytic converter with a blue-flame burner prior to starting up the internal-combustion engine. A further measure can also be operating at idling for a few minutes following normal operation. In addition, "empty running" of the catalytic converter immediately after starting the internal-combustion engine or during the operation of the internal-combustion engine (with a limited few exceptions in this case) can also be provided. In principle, a combination of these measures can also be provided.

In accordance with yet a further mode of the invention, in order to keep the exhaust gas stream free of undesired secondary products of urea resulting from incomplete hydrolysis, e.g. cyanuric acid, it is expedient if the feed is interrupted if the temperature falls below the specific minimum temperature of the catalytic converter. The depletion of the catalytic converter in reducing agent during such a phase can subsequently be brought under control again by superstoichiometric feeding when the specific minimum temperature of the catalytic converter is exceeded.

In accordance with a concomitant mode of the invention, an intolerable slip of reducing agent is particularly reliably avoided if the superstoichiometric feed during operation with decreasing exhaust gas temperature is not carried out until the temperature actually decreases at the catalytic converter, since it is not until then that the catalytic converter is able to actually store reducing agent, due to its storage capacity increasing with decreasing temperature.

Other features which are considered as characteristic for the invention are set forth in the appended claims.

Although the invention is illustrated and described herein as embodied in a method for the catalytic conversion of nitrogen oxides present in the exhaust gas of an internal-combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
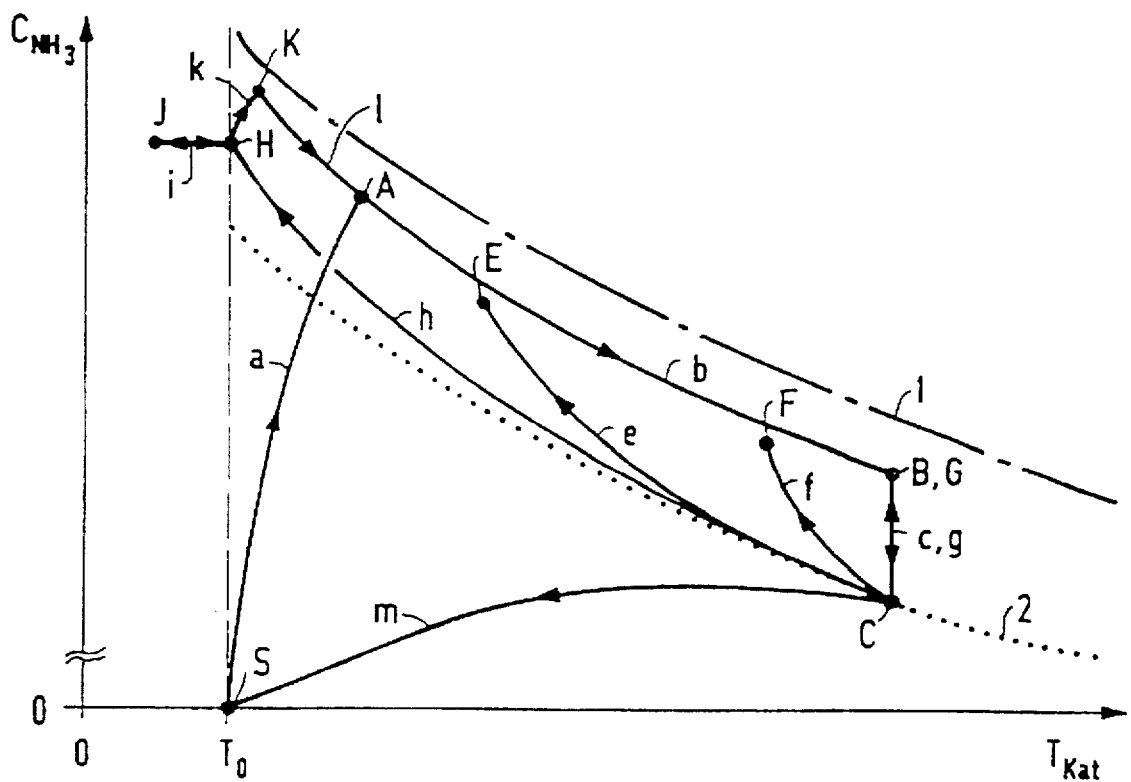
FIG. 1 is a graph which qualitatively shows typical causes of a stored ammonia concentration $C_{NH3}$ as a function of catalytic converter temperature $T_{kat}$.

Referring now to the figures of the drawings in detail and first, particularly, to FIG. 1 thereof, there is seen a dot-dash line 1 and a dotted line 2. The line 1 represents a maximum storage capacity of an SCR catalytic converter 20 with a superstoichiometric feed of a reducing agent 26, in this case an aqueous urea solution, which is hydrolyzed to form water and ammonia. The line 2 represents a maximum storage capacity of the SCR catalytic converter 20 for the ammonia resulting from the hydrolysis with a slightly substoichiometric feed of the reducing agent 26 in relation to a nitrogen oxide concentration prevailing in an exhaust gas 16.

Figure 2:
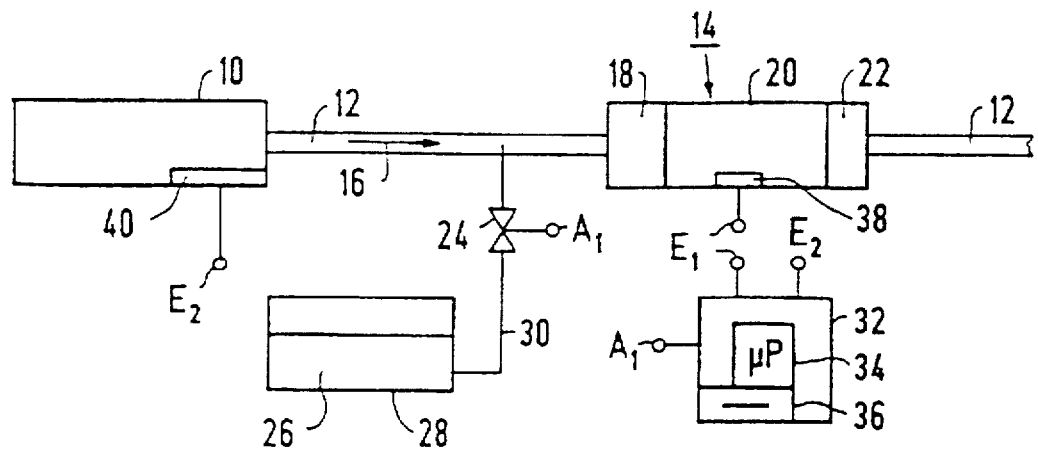
FIG. 2 is a diagrammatic view of an exhaust pipe of an internal-combustion engine operated with excess air.

As is seen in FIG. 2, a catalytic converter unit 14 disposed downstream of an internal-combustion engine 10 in an exhaust pipe 12, in the present case includes a hydrolysis catalytic converter 18, the SCR catalytic converter 20 and an oxidation catalytic converter 22, in that order. Upon starting up the internal-combustion engine 10, the catalytic converter unit 14 first heats up to a specific minimum temperature $T_0$ of the catalytic converter due to heat transmitted from the exhaust gas 16. Beginning with this temperature $T_0$, complete hydrolysis of the aqueous urea solution is achieved in the hydrolysis catalytic converter 18. At the same time, generally above this minimum temperature $T_O$, the catalytic reaction of the nitrogen oxides with the ammonia resulting from the hydrolysis begins at acceptable conversion rates. The system is at a point S at this operating point in the engine-starting phase. When the minimum temperature $T_O$ is reached, a superstoichiometric feed of the aqueous urea solution then begins and thus a superstoichiometric feed of the ammonia to the exhaust gas, giving a course corresponding to line a. When a point A is reached, a preferred charge level of the SCR catalytic converter 20 with ammonia is reached, so that the superstoichiometric feed of the urea solution is then decreased to a slightly substoichiometric feed. During this superstoichiometric feed, the amounts of ammonia consumed by the SCR catalytic converter 20 and the amounts of urea fed to the exhaust gas are summed. Additionally, if the temperature course of the specific storage capacity of the SCR catalytic converter 20 and its absolute storage capacity are known, it is known when the point A is reached. On-line determination of the catalytic converter temperature and on-line balancing of nitrogen oxide quantities, ammonia consumed and stored ammonia, thus take place.

During further operation of the internal-combustion engine, with an increase in the catalytic converter temperature, a course according to a curve b in the direction toward a point B was established. The reducing agent is fed slightly substoichiometrically during this operating period. There is no approximation to the line 2 due to the temperature elevation, because this temperature elevation is accompanied by desorption of the reducing agent due to the storage capacity decreasing with increasing temperature.

If the internal-combustion engine 10 is then operated at substantially constant load, the catalytic converter temperature also remains substantially constant. Due to the slightly substoichiometric feed of the reducing agent, the catalytic converter then empties in accordance with a curve c in the direction toward a point C which is on the line 2.

At this point in the metering strategy, various procedures can be followed depending on the operating state of the internal-combustion engine 10 following this point. A first alternative is to recharge the SCR catalytic converter 20 by superstoichiometric feeding along a curve g proceeding in the reverse direction to the curve c, to stop the superstoichiometric feed when a point G is reached, which is identical with the point B, and to continue feeding slightly substoichiometrically again.

Three further alternatives are envisaged according to the courses of curves e, f and h. These alternatives are characterized by an operating state with decreasing catalytic converter temperature. Due to the storage capacity of the SCR catalytic converter 20 for ammonia increasing with decreasing catalytic converter temperature, the aim of a subsequent superstoichiometric feed of the reducing agent 26 is to as closely as possible approximate the course according to lines b and 1 again in the course of the temperature decrease. When points E and F, which are near to or on the line b, are reached, this is recorded by a control unit 32, which determines the charge level of the SCR catalytic converter 20 with the reducing agent 26 at each operating time point. A special case of these three alternatives results when feeding is performed in accordance with a line h and when a point H is reached at the specific minimum temperature $T_O$ of the catalytic converter. If the temperature decreases further in accordance with a line i toward a point I, the feed is interrupted and not resumed until the point H is reached again. When the point H is reached again with a simultaneous temperature increase of the SCR catalytic converter 20, feed can thereupon be performed superstoichiometrically in accordance with a curve k, until a point K is reached. If the catalytic converter temperature increases further, a course of the curves 1 and b is achieved, due to the substoichiometric feed which is then initiated, so that the contemplated course of the charge level is again followed. A fifth alternative with regard to the method starting from the point C is represented by a curve m. Thus, it is contemplated herein, following normal operation of the internal-combustion engine 10, to cease the feed completely, if an end of the operation is envisaged within a time period of a few minutes. In this manner, for example, the internal-combustion engine 10 can continue to be run further at idling, until the SCR catalytic converter 20 is "run" completely free of reducing agent. In this case, the curve m need not end at the point S, but can alternatively reach the abscissa at a temperature higher or lower than the minimum temperature $T_O$. Due to the above-described process, with an SCR catalytic converter 20 which is charged in this manner with the reducing agent, in this case ammonia, particularly high conversion rates are achieved at each operating time point for the nitrogen oxides present in the exhaust gas of the internal-combustion engine. This is achieved since at each operating time point a sufficiently large amount of ammonia is stored in the catalytic converter and can be catalytically reacted there with nitrogen oxides absorbed by the catalytic converter. However, at the same time, the SCR catalytic converter 20, due to the contemplative method, is also able at any time to again store the amounts of ammonia desorbed from the SCR catalytic converter 20 due to an abrupt elevation in temperature of the SCR catalytic converter 20, because the preferred charge level differs from the maximum achievable saturation level of the SCR catalytic converter. In this way, a slip of the reducing agent is reliably avoided during such operating states.

As mentioned above, FIG. 2 diagrammatically shows the internal-combustion engine 10 operated with air excess and the exhaust pipe 12 attached thereto, into which the catalytic converter unit 14 is installed. As was also stated above, the catalytic converter unit 14 includes, in the direction of flow of the exhaust gas 16, the hydrolysis catalytic converter 18, the SCR catalytic converter 20 and the oxidation catalytic converter 22. An adjustable injection valve 24 for the aqueous urea solution 26 is provided upstream of the catalytic converter unit 14, as seen in the direction of flow of the exhaust gas. The aqueous urea solution is transported from a reducing agent tank 28 through a reducing agent feed line 30.

In addition, the control unit 32 which is provided includes a microprocessor subunit 34 and a floppy-disk drive 36. During operation of the internal-combustion engine 10, the control unit 32 captures the temperature of the SCR catalytic converter 20 measured by a measuring point 38 through an input E1, and it captures operationally relevant data of the internal-combustion engine 10 measured by a measuring point 40 which can include a plurality of sensors, through an input E2. The amounts of nitrogen oxide generated by the engine 10 are determined from these data through the use of the microprocessor subunit 34. At the same time, the operating state of the SCR catalytic converter 20 with respect to its catalytic activity and its specific storage capacity is determined. The operationally relevant data of the SCR catalytic converter 20 required for this purpose can be implemented in the control unit 32, for example through the floppy-disk drive 36. The amount of nitrogen oxide is determined through performance data stored in the control unit 32, by measuring engine rpm, travel of an injection pump control rod and the exhaust gas temperature during operation of the engine 10, through the use of the measuring point 40. The control unit 32 has an output A1 through which it controls the injection valve 24 for the aqueous urea solution as a function of the amount of nitrogen oxide generated by the engine 10 and the operating state of the SCR catalytic converter, in the manner described with regard to FIG. 1. The urea solution introduced into the exhaust gas 16 hydrolyzes to ammonia and water in the hydrolysis catalytic converter 18. The ammonia which is released in this manner is absorbed in the SCR catalytic converter 20, as are the nitrogen oxides present in the exhaust gas 16, and it reacts there catalytically with the nitrogen oxides to form nitrogen, oxygen and water. Hydrocarbons and carbon monoxide that are still present in the exhaust gas and any ammonia slip possibly occurring due to an operating fault are eliminated in the downstream oxidation catalytic converter 22.

We claim:

1. A method for the catalytic conversion of nitrogen oxides present in the exhaust gas of an internal-combustion engine, which comprises:

introducing a reducing agent into an exhaust gas of an internal-combustion engine upstream of a denitration catalytic converter, as seen in flow direction of the exhaust gas;

feeding the reducing agent superstoichiometrically in relation to a nitrogen oxide concentration only during operating periods in which the catalytic converter stores the reducing agent; and otherwise feeding the reducing agent substoichiometrically, the substoichiometric and superstoichiometric feed of the reducing agent being alternated.

2. The method according to claim 1, which comprises performing the step of feeding the reducing agent superstoichiometrically, during the starting phase of the internal-combustion engine and during operation with decreasing exhaust gas temperature, while taking the temperature-dependent storage capacity of the catalytic converter for the reducing agent into account.

3. The method according to claim 2, which comprises determining the temperature of the catalytic converter on-line.

4. The method according to claim 2, in which the reducing agent is supplied as urea and the urea is catalytically hydrolyzed, performing the superstoichiometric feed in the starting phase only after the catalyst temperature is effective to hydrolyze urea.

5. The method according to claim 4, which comprises interrupting the superstoichiometric feed when the catalyst temperature is not effective to hydrolyze urea.

6. The method according to claim 2, which comprises performing the superstoichiometric feed during operation with decreasing exhaust gas temperature only when the temperature actually decreases at the catalytic converter.

7. The method according to claim 1, which comprises performing the step of feeding the reducing agent superstoichiometrically, during a starting phase of the internal-combustion engine and during operation with decreasing temperature and periodically during virtually constant exhaust gas temperature, while taking a temperature-dependent storage capacity of the catalytic converter for the reducing agent into account.

8. The method according to claim 7, which comprises determining the temperature of the catalytic converter on-line.

9. The method according to claim 7, in which the reducing agent is supplied as urea and the urea is catalytically hydrolyzed, performing the superstoichiometric feed in the starting phase only after the catalyst temperature is effective to hydrolyze urea.

10. The method according to claim 9, which comprises interrupting the superstoichiometric feed when the catalyst temperature is not effective to hydrolyze urea.

11. The method according to claim 7, which comprises performing the superstoichiometric feed during operation with decreasing exhaust gas temperature only when the temperature actually decreases at the catalytic converter.

12. The method according to claim 1, which comprises determining a current concentration of reducing agent in the catalytic converter on-line.

13. The method according to claim 1, which comprises determining the nitrogen oxide concentration emitted from the internal-combustion engine on-line.

* * * * *